Oct. 28, 1969   E. G. OLSON ETAL   3,474,500
PROCESS AND APPARATUS FOR FORMING A FOAM FIBER BATT
Filed Nov. 14, 1967   2 Sheets-Sheet 1

INVENTORS
EDWIN G. OLSON
THOMAS M. WILLS
MALAK E. YUNAN

BY

ATTORNEY

Oct. 28, 1969   E. G. OLSON ETAL   3,474,500
PROCESS AND APPARATUS FOR FORMING A FOAM FIBER BATT
Filed Nov. 14, 1967   2 Sheets-Sheet 2

INVENTORS
EDWIN G. OLSON
THOMAS M. WILLS
MALAK E. YUNAN
ATTORNEY

United States Patent Office 3,474,500
Patented Oct. 28, 1969

3,474,500
PROCESS AND APPARATUS FOR FORMING
A FOAM FIBER BATT
Edwin G. Olson, Newark, and Thomas M. Wills and
Malak E. Yunan, Wilmington, Del., assignors to E. I.
du Pont de Nemours and Company, Wilmington, Del.,
a corporation of Delaware
Filed Nov. 14, 1967, Ser. No. 682,937
Int. Cl. D01b 3/04; D01g 25/00, 27/00
U.S. Cl. 19—66                                    10 Claims

ABSTRACT OF THE DISCLOSURE

Process and apparatus for forming uniform batts of low density, closed cell, randomly oriented foam fibers. Process involves conveying the fibers from a supply and submerging them in a body of liquid, blocking the passage of excess fibers, forming the submerged fibers into a batt and removing the batt from the liquid. Apparatus includes tank of liquid, fiber-submerging device (e.g. spiked endless belt), fiber barrier and metering means (e.g. spiked stripper roll), fiber collecting and batt transporting device (e.g. second endless belt located above terminus of fiber submerging device).

BACKGROUND

This invention is concerned with a fibrous batt formation process and apparatus. More particularly it is concerned with process and apparatus for formation of resilient batts of closed-cell foam staple fibers whose density is less than 0.5 g./cc.

Recently there have become available cellular fibers of very low density having excellent pneumatic properties. These fibers in general are prepared from synthetic organic polymers and are composed predominately of small closed polyhedral cells defined by thin film-like walls of polymer. The gas entrapped within the cells acts as a pneumatic cushion to support applied loads as well as to contribute form stability, i.e. a degree of stiffness, to the cellular fibers. These fibers are ideally suited for use in batt form in cushioning applications such as mattresses, sleeping bags, and upholstered furniture cushions, and also in thermal insulation applications such as garment linings and comforters.

Unfortunately, commercial carding and garnetting techniques which have traditionally been used to prepare batts of conventional staple fibers may be employed only with difficulty in the case of the low density cellular fibers. Thus, batts of uniform fiber distribution and random fiber orientation have been difficult to prepare due to handling problems peculiar to the cellular staple occasioned by their relatively large fiber diameter (commonly 2 to 3 mm.) and stiffness compared to ordinary dense staple fibers, their extreme sensitivity to air currents resulting from their combination of large volume and small mass, and their high surface friction which leads to breakage of fibers during attempts to open balls or clumps thereof. These features contribute to poor machine processability which is further compounded by the well-known tendency for synthetic-polymer fibers to develop high-charges of static electricity during processing. Such high charges produce strong forces of attraction between the fibers and various parts of machinery, overwhelm the weak gravitational force on the lightweight fibers, and promote the formation of balls and clumps which frequently jam the machinery.

SUMMARY OF THE INVENTION

It has now been found that these difficulties can be overcome by submerging the fibers in liquid and utilizing the buoyant effect of the liquid to hold the fibers against conveying surfaces. Thus in accordance with this invention there is provided a process for forming a uniform resilient batt of randomly disposed, staple-length, closed cell foam fibers of density less than 0.5 g./cc. which includes the following steps: (A) conveying the fibers from a supply; (B) submerging the fibers in a body of liquid utilizing the buoyant effect of the liquid to urge the fibers against the submerging surface; (C) metering the quantity of fibers by blocking the passage of excess fibers, and forming a uniform layer of fibers on the underside of the submerging surface; (D) releasing the layer of fibers and permitting the fibers to float freely upward toward the surface of the liquid; (E) collecting the fibers as a batt; and (F) removing the batt from the liquid. In the preferred embodiment steps (B), (C), and (D) are repeated in the same order prior to step (E) in order to further improve the uniformity of the batt.

The invention also includes an apparatus for performing the process which includes: a tank containing a body of liquid; a fiber-submerging device comprising an endless curvilinear surface disposed about and rotatable about a horizontal axis, at least partially submerged in the liquid, and having outwardly extending spikes; means for feeding fibers to the surface at a location where the surface is movable in a generally downward direction, and the spikes are oriented in a generally downward direction; fiber barrier and metering means positioned near the lower, submerged terminus of the fiber submerging device at a location where the surafce is movable in a generally downward direction, in proximity to the outer ends of the spikes, and extending across the width of the surface; and means for removing the fibers in batt form from the liquid.

In the preferred embodiment of the apparatus the fiber submerging device is an endless inclined, partially submerged belt which is rotatable in a direction such that the lower loop of the belt moves in a generally downward direction when the apparatus is in operation. The preferred fiber barrier and metering means is a spiked stripper roll which is rotatable in a direction opposite to the direction of revolution of the endless belt. The means for removing the batt from the liquid can comprise a generally horizontal endless belt which is at least partially submerged in the liquid near the surface thereof with a submerged portion positioned vertically above the lower terminus of the fiber-submerging device.

Further details of the preferred process and apparatus are described below. It will be observed that in this preferred embodiment, the buoyant effect of the liquid strongly urges the fibers against working surfaces, e.g., the underside of the lower loop of the spiked belt, thus overcoming one of the problems associated with use of prior art techniques for forming uniform batts of randomly oriented foam fibers. Where water or other conductive substance is used as liquid, this eliminates the problem of static buildup. Other advantages will be apparent from the description which follows.

DETAILED DESCRIPTION

Figure 1:
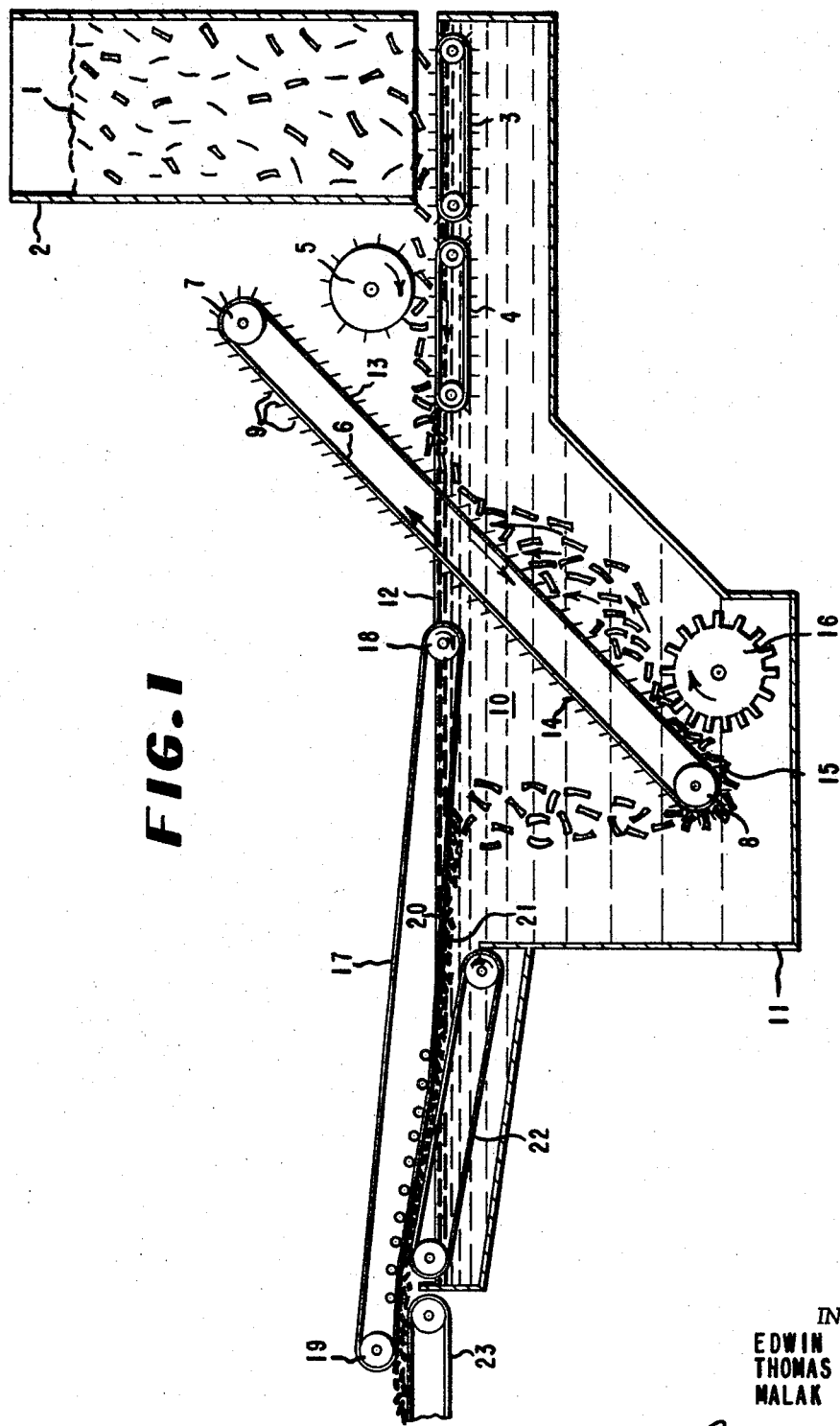
FIGURE 1 is a diagrammatic representation of a side elevational view of a preferred apparatus combination in operation.

Referring to FIGURE 1, a supply of low density cellular staple fiber 1 is conveyed to a fiber-submerging device from storage bin 2 by means of spiked belts 3 and 4 and spiked drum 5. Belt 4, running at a higher velocity than belt 3, strips the staple from belt 3; spiked drum 5, running at a lower velocity, helps to prevent gross clumps of fibers from passing to the fiber-submerging device.

The fiber-submerging device is composed of a spiked endless belt 6 trained to run about a pair of parallel, horizontally and vertically-spaced-apart rolls 7 and 8. Spikes 9 extend outwardly from the surface of the belt 6. Lower roll 8 and part of spiked belt 6 are submerged in a body of water 10 contained in tank 11. Belt 6 is positioned in the water 10 obliquely to the surface 12 thereof. Spiked belt 6 and associated rolls 7 and 8 are rotated at constant velocity by means not shown in a direction such that lower loop 13 of belt 6 moves in a downward direction whereas upper loop 14 moves in an upward direction.

Staple fibers 1 supplied to the underside of the lower loop 13 of spiked belt 6 near the surface 12 of the water 10 are thus carried down through the body of water 10 against their tendency to float, on being engaged by the spikes 9.

All the excess staple, i.e., that portion further removed from the belt 6 than the plane defined by the ends of spikes 9, is brushed off by the counter-rotating spiked stripper roll 16. Roll 16 is positioned, as shown, near the lower roll 8 and adjacent to the lower loop 13 of belt 6. The cylindrical surface defined by the ends of the spikes on roll 16 is spaced from belt 6 by a distance at least equal to but not substantially greater than the distance of the ends of spikes 9 from belt 6.

The combination of spiked belt 6 and stripper roll 16 thus serves as a fiber metering device. A uniformly thick layer 15 of staple (defined by the height of spikes 9) passes the stripper roll 16. The surface velocity of roll 16 is preferably greater than that of belt 6, and in fact it is desirable that a turbulent region be created in the water 10 above the roll 16 in order to insure complete coverage of the entire lower surface of belt 6.

As spiked belt 6 rounds roll 8, uniform layer 15 of somewhat directionally oriented fibers can be transferred from spiked belt 6 to the underside of an endless conveyor belt which conveys the layer toward the surface 12 of the water 10 and eventually toward an edge of vessel 11 for removal.

It is preferred, however, that layer 15 be permitted to float freely upward toward surface 12 after rounding roll 8. As layer 15 floats upwardly, it disintegrates so that fibers 1 are redistributed to collect near surface 12 as a uniform batt 21 of randomly oriented fibers 1. Although batt 21 can float unrestricted on surface 12, it is further preferred that it be collected against the submerged lower loop 20 of endless conveyor belt 17.

Conveyor belt 17 is trained to run about a pair of parallel horizontally-spaced-apart rolls 18 and 19. As shown, rolls 18 and 19 may also be spaced apart vertically, but the orientation of belt 17 is generally horizontal. A portion of belt 17 is submerged in the water 10 near the surface 12 thereof and this submerged portion is located vertically above the point where the submerged fibers are released, i.e., the lower roll 8 of the fiber-submerging device. The vertical distance between roll 8 and belt 17 can be adjusted to provide optimum redistribution of the staple 1. As the fibers 1 approach the surface 12 of the water 10 they are intercepted by the underside of the lower loop 20 of belt 17 and are randomly collected thereon as a uniform batt 21. Belt 17 and associated rolls 18 and 19 are rotated at constant velocity by means not shown in a direction such that the lower loop 20 of the belt 17 travels toward an edge of the body of water 10. Batt 21 is thereby advanced toward the exit end of tank 11, from which it is lifted and transported by conveyor belts 22 and 23 driven at the same velocity as belt 17. This velocity will preferably be set at some fraction, say ⅓, of the velocity of spiked belt 6 to allow a further "averaging" of the staple deposition for improved batt uniformity.

Conveyor belt 17 may be impervious since no flow of water through its collecting surface need occur (as contrasted to paper-making deposition processes where fibers dispersed in a fluid are filtered out to form a web on a screen). It is characteristic of the process of this invention, however, that air is usually entrained with the fibers and released to float up with them to belt 17. Thus, it is preferred that belt 17 be sufficiently pervious to permit ready passage of air therethrough, thus avoiding accumulation of bubbles under belt 17 and consequent decrease in uniformity of collected batt 21. Sometimes, particularly when collecting batts of low weight per unit of area, uniformity of the batt can be further improved by locating a suction box against the upper surface of lower loop 20 of belt 17 so that water is drawn through belt 17 at a point above the point of fiber-release at roll 8. In this way, water-velocity gradients are established which tend to direct fibers to any thin spots in forming batt 21. The use of such a suction box is an obvious modification of the apparatus described.

Figure 2:
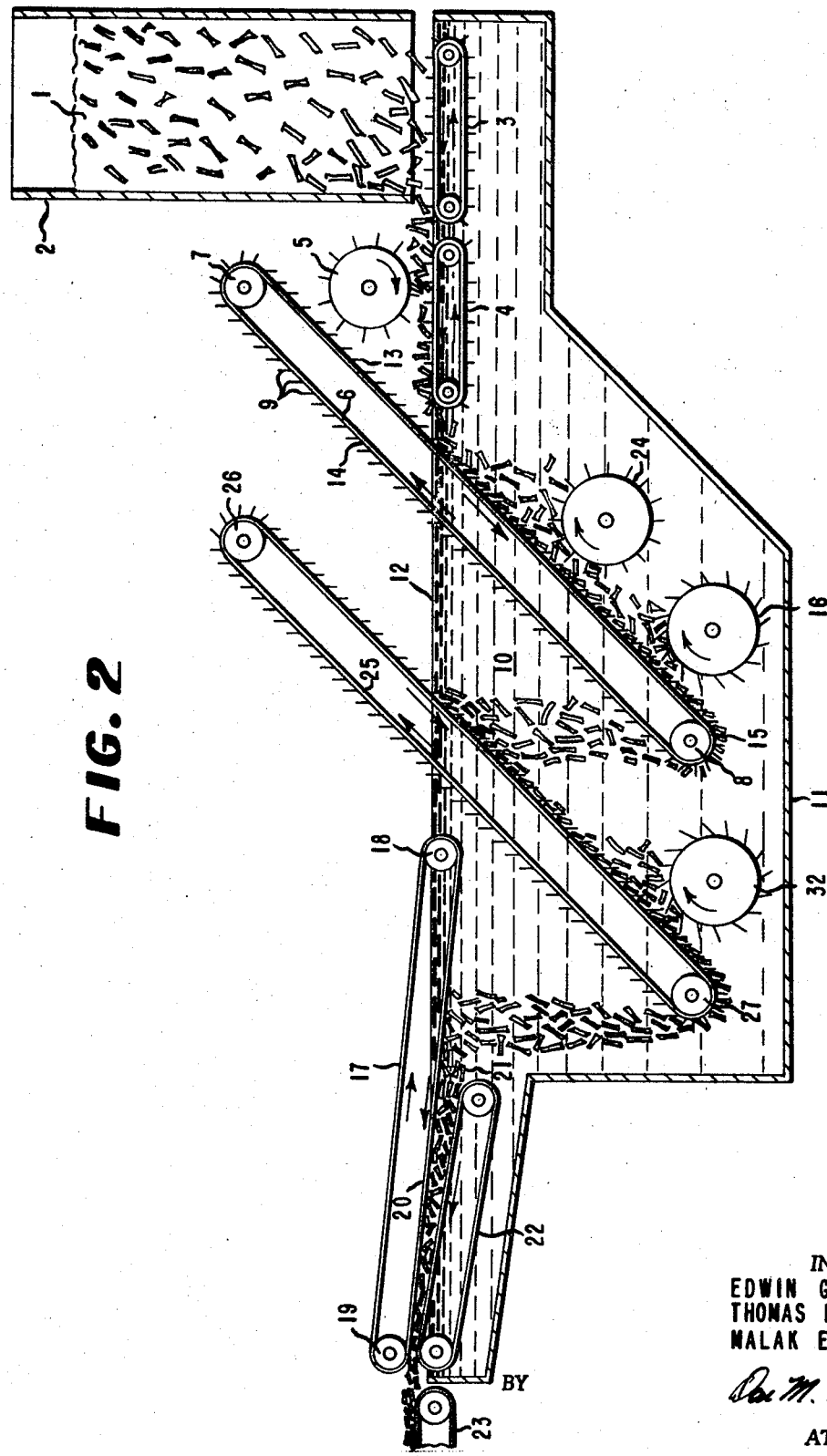
FIGURE 2 is a similar view of a preferred embodiment in which there are two inclined spiked belts operating in tandem. The purpose of the second inclined spiked belt and associated stripper roll is to repeat steps (B), (C) and (D) in the same order prior to step (E). Corresponding parts on the two figures are numbered identically.

As shown in FIGURE 2 and described in Example III, two or more spiked belts can be operated in tandem, each feeding the next and only the last discharging the submerged fibers to batt-collection and batt-removal means. In this way uniformity of staple metering may be improved, particularly when vertical space available is insufficient to provide for adequate combing and brushing along the submerged portion of a single spiked belt. Again as shown in FIGURE 2, the uniformity of metering the staple improves by providing two or more stripper rolls along lower loop of each spiked belt, each stripper roll being spaced from the others and positioned below the water-level. Further, spiked belt 6 may be replaced by a revolving drum bearing similar spikes on its surface; spiked roll 16 may be substituted by moving or stationary combing and brushing devices which provide the required metering action; and revolving doffer rolls or directed jets of water may be employed to assist in clearing initial batt 15 from belt 6 after rounding roll 8. Liquids other than water may be used in tank 11, but in spite of the greater buoyancy which results with denser liquids, water is preferred in view of its low cost, low toxicity, non-flammability, and good electrical conductivity for control of static electricity. Various means (e.g., air-stream conveyors, gravity feed, etc.) may replace belts 3 and 4 for feeding fibers 1 to the fiber-submerging device. All that is required is that the supply of staple be abundant (within reason), i.e., the supply need be neither continuous nor at constant rate so long as sufficient staple is provided to correspond to the ultimate batt-removal rate.

A still further advantage of this invention is that other process objectives may simultaneously be carried out while the staple is immersed in the liquid, e.g. treatment of the staple with dye-stuffs, lubricants, anti-stats, adhesives, etc. which may be dissolved or dispersed in the liquid.

The following examples serve to further illustrate the invention. Two experimentally measured properties are used to assess uniformity of weight distribution in the batts formed. The coefficient of variation (expressed in percent) of the indicated property is used to describe the uniformity of the batt, the coefficient being defined for a set of measurements of samples of the same size as $$\frac{(\text{standard deviation})}{\text{mean}} \times 100$$

In one case, weights of samples are measured. In the other, heights of the samples under a uniform compressive load of 5 p.s.i.g. (0.35 kg./cm.² gage) are obtained. Substantially equivalent numerical coefficients result from both methods. The latter method has the advantage of defining uniformity in terms of compressibility, a behavior directly related to the ultimate use of these cushioning structures. Batts having a coefficient of variation less than 20% ordinarily appear uniform on visual inspection, and values less than 10% are considered exceptionally good.

EXAMPLE I

Polyethylene terephthalate closed-cell foam fibers of density 0.029 g./cc. and diameter 70 mils (0.178 cm.) are provided as 4″ (10.2 cm.) cut staple, fed by hand in bulk form onto the surface of a tank of water and urged against the surface of a partially submerged rotating drum. The 12″ (30.5 cm.) diameter by 4′ (122 cm.) long drum has a pattern of $\frac{1}{16}$″ (0.16 cm.) diameter spikes approximately ½″ (1.27 cm.) long located on 2″ (5.1 cm.) centers with alternate rows staggered. The rotating action of the drum combs the foam fibers from the bundle and pulls them under water. The fiber buoyancy pins the staple to the underside of the drum and excess staple is removed by a 5″ (12.7 cm.) diameter submerged stripper roll provided with ½″ (1.27 cm.) long spikes on its surface. The axes of the drum and roll are parallel and are separated by a distance such that the cylindrical surfaces defined by the tips of the spikes are approximately tangent. The point of tangency occurs toward the "feed" side of the bottom-dead-center of the 12″ (30.5 cm.) drum, and the roll is counter-rotated such that the surface velocity of the stripper roll is approximately twice that of the 12″ (30.5 cm.) spiked drum.

The metered quantity of foam fibers carried part the stripper roll by the pins on the drum is allowed to float to the surface on the discharge side of the drum where the staple forms a batt which is led away from the drum. This batt is approximately ½″ (1.27 cm.) thick and has uniform fiber distribution as judged by a coefficient of weight variation of about 18% (measured on 1″ [2.54 cm.] squares cut from the batt). The batt is subsequently sprayed with approximately 20 weight percent of a latex binder, dried and cured. It is useful in such cushioning applications as carpet underlay, packing, padding, etc.

EXAMPLE II

Polyethylene terephthalate closed-cell fibers of density 0.022 g./cc. and diameter approximately 70 mils (0.178 cm.) are furnished as 5″ (12.7 cm.) long stable. The fibers are conveyed into a tank of water from a storage bin approximately 3′ x 4′ x 9′ (91.5 x 122 x 274.5 cm.) high on a horizontal belt extending into the bottom of the bin. The motor driving this belt is started and stopped alternately by a limit switch which senses the quantity of staple available at the input of a spiked belt partially submerged in the tank. This spiked belt is composed of closely spaced transverse wooden slats carried on fabric tape belts around two 8″ (20.3 cm.) diameter rolls, analogous to the arrangement shown in FIGURE 1. The angle between the plane passing through the axes of the rolls 7 and 8 and the water surface is approximately 45°. Each 1⅜ inch (3.49 cm.) wide wooden slat carries on its beveled leading edge a row of spikes set at ½ inch (1.27 cm.) intervals whose tips protrude ½″ (1.27 cm.) above the plane of the face of the slats, and which spikes are inclined 45° to this plane in the forward direction, as indicated in FIGURE 1. The metering device is a 14″ (35.6 cm.) diameter stripper roll surfaced with a $\frac{3}{16}$″ (.48 cm.) thick grooved rubber belt, the grooves being ⅛″ x ⅛″ (.32 x .32 cm.) square channels separated by ⅛″ (.32 cm.) square teeth and the channels being oriented parallel to the axis of the roll. The plane defined by the tips of the spikes on the inclined spiked belt is approximately tangent to the cylinder defined by the tips of the teeth of this roll. The conveyor belt 17 is an endless, fine screen located approximately 18″ (45.7 cm.) above the axis of the lower 8″ (20.3 cm.) roll 8, approximately as shown in FIGURE 1. All belts, rolls, etc. are 3′ wide (91.5 cm.). The spiked belt 6 is driven at 100 f.p.m. (30.5 m./min.), the stripper roll 16 at a surface speed of 155 f.p.m. (47.2 m./min.) (counter to the drive direction of the spiked belt) and the conveyor belt 17 at 33 f.p.m. (10.1 m./min.).

The cellular staple which is provided on the surface of the water by the horizontal conveyor belt 4 is carried down into the liquid by the spiked belt 17, past the stripper roll metering station, and released to float upward and be trapped as a 3′ (91.5 cm.) wide batt approximately 1.5″ (3.8 cm.) thick under the conveyor belt 17, and then transported out of the liquid at a linear rate of 33 f.p.m. (10.1 m./min.). The staple has a random orientation in the batt (e.g. no preferred directionality) and a uniform distribution as judged by a coefficient of weight variation of about 10% measured on 2½″ (6.4 cm.) squares. The batt may subsequently be bonded, embossed, etc. and is useful as a cushioning or thermal insulating material.

EXAMPLE III

Another batt of randomly oriented, closed-cell, foamed fibers is prepared substantially as described for Example II. Apparatus is modified as indicated in FIGURE 2. A second submerged stripper roll 24 is employed with spiked belt 6, and spiked belt 25 with associated stripper roll 32 is added to operate in tandem with the first fiber-metering device. The fibers used differ from those described in Example II only by exhibiting a density of 0.024 gm./cc. and by being furnished in 6 inch (15.2 cm.) staple length. The width of all belts, rolls, etc. in the apparatus is 3 feet (91.5 cm.), and the continuously formed batt 21 has this same width.

Spiked belts 6 and 25 are essentially identical. Each is composed of transverse water-impervious slats bolted at their ends to two sprocket-chains carried around 10 inch (25.4 cm.) diameter sprockets 7, 8 and 26, 27. The angle between the plane passing through the axes of each pair of sprockets and the water surface is approximately 45°. Each 1⅜ inch (3.49 cm.) wide by ⅝ inch (1.59 cm.) thick slat carries on its 45° beveled leading edge a row of spikes set at 1 inch (2.54 cm.) intervals so that the tips protrude 0.5 inch (1.27 cm.) above the plane of the face of the slat. Thus, the spikes are inclined 45° forward of this plane as indicated in FIGURE 2. Center-to-center spacing of adjacent slats are staggered transversely by 0.5 inch (1.27 cm.). A first rough stripping roll 24 is 12 inches (30.5 cm.) in diameter and is constructed of slats as described with the spikes extending perpendicularly from the slat-faces. Fine stripping rolls 16 and 32 are also 12 inches (30.5 cm.) in diameter but constructed of stainless steel tubes with end-plates and axles. The spikes protruding from these stripper rolls extend to 1 inch (2.54 cm.) radially beyond the roll-surfaces, are spaced 0.5 inch (1.27 cm.) apart in staggered rows, and are inclined backward (with reference to their direction of rotation) at an angle of 60° to a plane tangent to the roll surface at the points of attachment. The planes defined by the tips of the spikes on spiked belts 6 and 25 are approximately tangent to the cylinders defined by the tips of spikes on corresponding stripper rolls 16, 24, and 32.

Conveyor belt 17 is an endless, fine screen located approximately 18 inches (45.7 cm.) above the axis of lower sprocket 27, as indicated in FIGURE 2. Spiked belts 6 and 25 are driven at 39 ft./min. (11.9 m./min.); stripper rolls 16, 24, and 32 rotate at surface speeds of 60.4 ft./min. (18.4 m./min.) counter to the drive directions of the spiked belts; and conveyor belts 17, 22, and 23 are operated at 13 ft./min. (3.96 m./min.).

Spiked belt 6 and associated stripping rolls 16 and 24 meter fibers to the release point around sprocket 8. Frequently, however, a minor amount of residual clumping of the fibers is inaccessible to combing by rolls 16 and 24. By rearrangement during flotation to second inclined spiked belt 25 and by the further combing action of stripper roll 32, an improvement in the uniformity of metering fibers for flotation to and collection under conveyor belt 17 is usually obtained. Improved metering uniformity causes correspondingly improved uniformity in collected batt 21. The batt of this example as collected under belt 17 has a random fiber-orientation (i.e., no preferred directionality) and is about 1.5 inches (3.8 cm.) thick.

Coefficient of compressibility variation is determined continuously on 2½ x 3 inch (6.35 x 7.62 cm.) areas spaced across the width of the batt and not cut out from the batt. Batt thickness under a constant load of 5 p.s.i.g. (0.35 kg./cm.² gage) is the actual measurement. In this way, coefficient of variation is obtained repetitively over the whole length of the batt. Computer coefficients vary from about 5 to about 15%, but on the average are about 10%.

What is claimed is:

1. Apparatus for forming a resilient batt of randomly disposed, staple-length, closed-cell foam fibers of density less than 0.5 g./cc. which comprises:
    a tank containing a body of liquid;
    a fiber submerging device comprising an endless curvilinear surface
        disposed about and rotatable about a horizontal axis,
        at least partially submerged in the liquid, and having outwardly extending spikes;
    means for feeding fibers to the surface at a location where
        the surface is movable in a generally downward direction, and
        the spikes are oriented in a generally downward direction;
    fiber barrier and metering means
        positioned near the lower, submerged terminus of the fiber submerging device, at a location where the surface is movable in a generally downward direction, in proximity to the outer ends of the spikes, and
        extending across the width of the surface; and
    means for removing the fibers in batt form from the liquid.

2. Apparatus of claim 1 wherein the fiber submerging device is an endless belt rotatably mounted obliquely to the surface of the liquid, the belt being rotatable in a direction such that the lower loop thereof is movable in a generally downward direction.

3. Apparatus of claim 2 wherein the fiber barrier and metering means is a spiked stripper roll which is positioned parallel to and adjacent to the lower submerged terminus of the fiber submerging device, the stripper roll being rotatable in a direction opposite to the direction of rotation of the endless belt.

4. Apparatus as defined in claim 3 wherein the means for removing the batt from the liquid comprises:
    a generally horizontal endless belt
        trained to run about a pair of parallel horizontally-spaced-apart rolls,
        the belt being at least partially submerged in the liquid near the surface thereof,
    a submerged portion of the belt being positioned vertically above the lower submerged terminus of the fiber submerging device.

5. Process for forming a resilient batt of randomly disposed, staple-length, closed-cell foam fibers of density less than 0.5 g./cc. which comprises continuously:
    (A) conveying the fibers from a supply;
    (B) submerging the fibers in a body of liquid utilizing the buoyant effect of the liquid to urge the fibers against a submerging surface;
    (C) metering the quantity of fibers by blocking the passage of excess fibers, and forming a uniform layer of fibers on the underside of the submerging surface;
    (D) releasing the layer of fibers and permitting the fibers to float freely upward toward the surface of the liquid;
    (E) collecting the fibers as a batt; and
    (F) removing the batt from the liquid.

6. Process of claim 5 wherein steps (B), (C), and (D) are repeated in the same order prior to step (E).

7. Process of claim 5 wherein the liquid is water.

8. Process of claim 6 wherein the liquid is water.

9. Process of claim 7 wherein the fibers have a density of less than 0.1 g./cc.

10. Process of claim 8 wherein the fibers have a density of less than 0.1 g./cc.

References Cited

UNITED STATES PATENTS 2,764,289  9/1956  Scheid _____ 209—173
3,228,067  1/1966  Strang et al. _____ 19—66

DORSEY NEWTON, Primary Examiner

U.S. Cl. X.R.

19—155